Patented July 26, 1927.

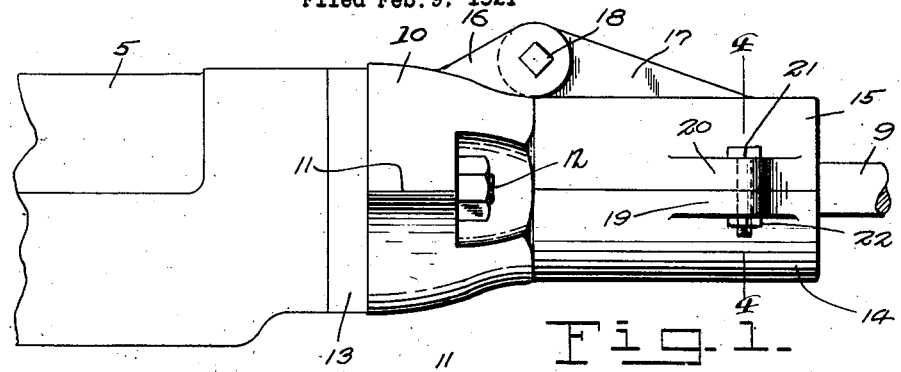
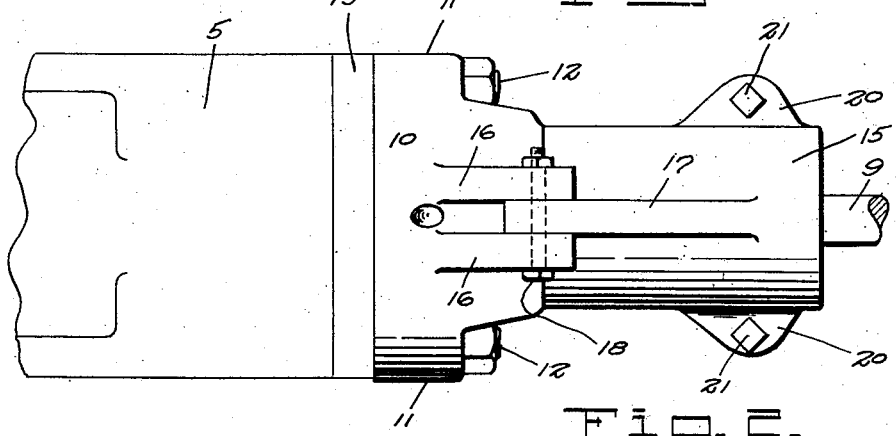
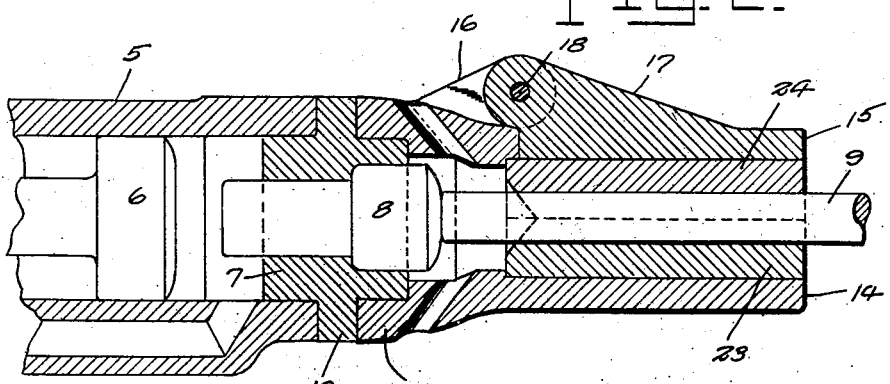
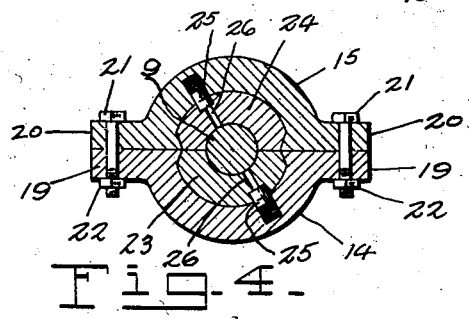

1,636,934

UNITED STATES PATENT OFFICE.

WALTER H. GOODLAND AND JOHN H. GOODLAND, OF BUTTE, MONTANA.

ROCK-DRILL HOLDER.

Application filed February 9, 1921. Serial No. 443,551.

This invention relates to rock-drilling machines, and more particularly to the front head or drill holding portion thereof, and the invention has for its object to provide a novel and improved drill holder which permits the drill to be easily and quickly applied and removed.

In ordinary rock-drilling machines, the front head or drill holder is usually made in one solid piece of wrought iron, with a hole to receive the drill shank, the drill being inserted from the front end. Owing to the pounding of the anvil block of the machine against the inner end of the drill shank, said end soon becomes enlarged or upset, and hence it is now impossible to slide the drill forwardly for its removal, and the removal of the stuck drill cannot be effected without taking the whole machine to a shop or other place having the necessary tools and appliances for that purpose, but often more or less remote from the place where the machine is being used. This operation involves considerable expense and loss of time, especially where many drilling machines are being used. The present invention has been designed to obviate this loss of time and money, and it consists in a drill holder embodying certain novel features of construction to be hereinafter described in detail and claimed.

The invention also has for its object to provide the holder with a means whereby it is adapted for drills of different cross-sectional contours.

In order that the invention may be better understood, reference is had to the accompanying drawing forming a part of this specification, and in said drawing—

Figure 1 is a side elevation of the holder; Fig. 2 is a plan view thereof; Fig. 3 is a central longitudinal section; and Fig. 4 is a cross-section on the line 4—4 of Fig. 1.

Referring specifically to the drawing, 5 denotes a fragment of the cylinder of a rock-drilling machine in which works a piston 6 operated by compressed air in a manner which is immaterial to the present invention, in view of which it need not be illustrated nor described. The forward end of the cylinder is fitted with the usual bushing 7 in which works the anvil block 8 which receives the impact of the piston 6 and transmits the same to the shank 9 of the drill by abutting against the rear end of the latter.

The front head of the cylinder 5 which is the holder for the drill consists of a substantially annular rear portion 10 and a reduced forwardly extending drill holding portion, the former having diametrically opposite outstanding ears 11 through which pass bolts 12 carried by the cylinder, whereby the head is secured to the latter. The bushing 7 has an outstanding flange 13 positioned between the forward end of the cylinder and the rear end of the part 10, and clamped therebetween, the bolts 12 also passing through said flange.

The drill holding portion of the front head is divided longitudinally into two similar half sections or portions 14 and 15, respectively, having their contiguous faces recessed to form the hole in which the drill shank is adapted to be placed, or to receive a bushing to be presently described. The section 14 is rigid with the part 10, and the section 15 is hinged, said part 10 having spaced ears or lugs 16 between which seats a rib 17 on the outside of the section 15. A pin 18 passing through the ears 16 and the tongue 17 completes the pivotal connection of the section 15 with the part 10.

At diametrically opposite points, the section 14 has outstanding ears 19, and the section 15 has similar outstanding ears 20. When the section 15 is closed down on the section 14, the ears 19 and 20 come together, and by passing bolts 21 therethrough, secured by nuts 22, the two sections are rigidly coupled together to hold the drill shank 9, the latter seating in the bushing or in the longitudinal hole formed by the two matching recesses in the contiguous faces of the sections.

It will be evident from the foregoing that the parts 14 and 15 form two opposite jaws between which the drill shank 9 is held, and as the jaw 15 can be swung outwardly or away from the jaw 14 after disconnecting the fastening means 21 and 22, the drill can be easily and quickly removed and also replaced and this can be done at the place where the machine is operating, and by the person using the same.

As the jaw members 14 and 15 can be opened up, bushings may be provided to adapt said jaw members for drills of various shapes. The drawing shows one of these bushings, the same being divided longitudinally into two sections denoted at 23 and 24 respectively, one of which is fitted to one jaw member and the other to the other jaw member.

The inner faces of the jaw members 14 and 15 are grooved to seat the bushing sections 23 and 24, the grooves being semicircular, and slightly contracted where they open into the faces of the jaw members, to hold the bushing section against dropping down out of the grooves. Each bushing section is also locked to the jaw member to which it is applied by a spring-pressed latch pin 25 seating in a socket or recess in the wall of the grooved portion of each jaw member and adapted to enter a transverse counterbored outer end of the keeper recess or holes 26 in the bushing. The recess or holes 26 extends completely through the bushing so that a pin may be inserted for forcing the latch pin 25 out of the same to release the bushing section when the latter is to be removed.

It will be understood that bushings of various shapes will be provided for holding different shapes of drills.

We claim:

In a rock drill, a substantially annular head provided at its ends with internal shoulders and having diametrically opposite outstanding ears provided with holes for passage of fastenings for securing the head to the cylinder of a machine, said head being further provided on its top with upstanding spaced lugs and being also equipped with a reduced forwardly projecting transversely curved portion forming one-half of a drill holder, a correspondingly shaped curved portion co-acting with said first named curved portion to complete the drill holder, said correspondingly shaped portion carrying an external vertical rib having its inner end disposed between said lugs and pivotally connected thereto, both of said drill holding portions being provided at their meeting edges with lateral ears having alined holes for passage of fasteners for securing the two portions together, and a sectional longitudinally split bushing fitted into the drill holding portions and bearing against the outer one of the aforesaid shoulders.

In testimony whereof we affix our signatures.

WALTER H. GOODLAND.
JOHN H. GOODLAND.